United States Patent [19]

Friedman, III

[11] Patent Number: 4,682,146

[45] Date of Patent: Jul. 21, 1987

[54] AUTOMOTIVE INDICATOR SYSTEM

[76] Inventor: Harry Friedman, III, 9 Sewell Ave., Brookline, Mass. 02146

[21] Appl. No.: 818,261

[22] Filed: Jan. 13, 1986

[51] Int. Cl.$^4$ .............................................. B60Q 1/26
[52] U.S. Cl. ...................................... 340/77; 340/67;
340/71; 340/72; 340/73; 340/82; 340/97;
340/105; 40/545; 362/263; 116/42
[58] Field of Search .................. 340/77, 74, 105, 67,
340/82, 71, 72, 73, 97, 331, 332; 40/558, 544,
545, 406; 362/71, 217, 210, 229, 263, 265;
116/42

[56] References Cited

U.S. PATENT DOCUMENTS

| Re. 21,613 | 10/1940 | Vollrath . | |
|---|---|---|---|
| 1,615,791 | 1/1927 | Frieman et al. | 116/42 |
| 1,879,057 | 9/1932 | Bray . | |
| 2,004,365 | 6/1935 | Bidwell . | |
| 2,018,874 | 10/1935 | Reitherman et al. | 340/105 |
| 2,026,770 | 1/1936 | Bergman . | |
| 2,062,174 | 11/1936 | Haskins et al. . | |
| 2,265,068 | 12/1941 | Foerste . | |
| 3,019,415 | 1/1962 | Marion, Sr. | 340/82 |
| 3,183,881 | 5/1965 | Tatham, III | 116/42 |
| 3,235,768 | 2/1966 | Magnuski | 315/39 |
| 3,846,749 | 11/1974 | Curry | 340/72 |
| 4,127,844 | 11/1978 | Purdy | 340/77 |
| 4,231,013 | 10/1980 | Freeman et al. | 340/72 |
| 4,477,796 | 10/1984 | Kearsley | 340/77 |
| 4,550,305 | 10/1985 | Bookbinder | 340/72 |

Primary Examiner—Donnie L. Crosland
Attorney, Agent, or Firm—Wolf, Greenfield & Sacks

[57] ABSTRACT

A rare gas automobile indicator light system employing a single horizontally disposed indicator tube operated to provide braking, parking, emergency flasher and turn indications. The indicator tube is operated at partial intensity for a parking function and at full intensity for braking function. The indicator is further operated by excitation of a single electrode on either side thereof to provide respective left and right-hand turn indications by providing a sweeping action of the light propagation to provide a pointing effect in the desired direction. The emergency flasher indication is carried out by virtue of causing periodic on and off switching of the indicator tube.

21 Claims, 15 Drawing Figures

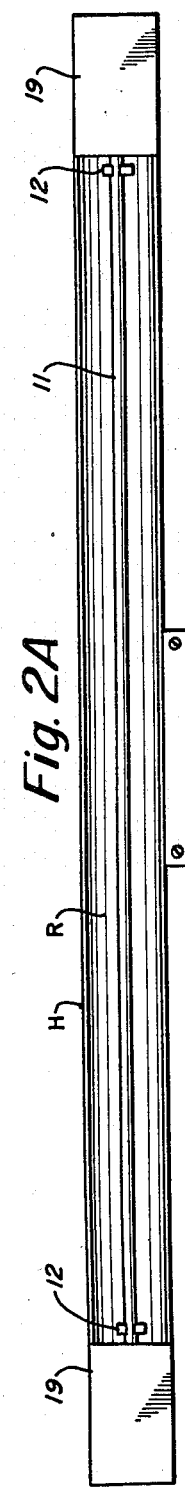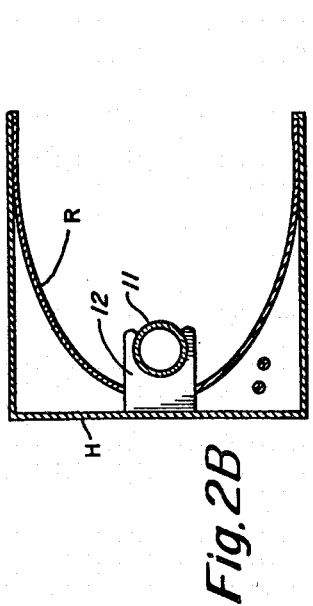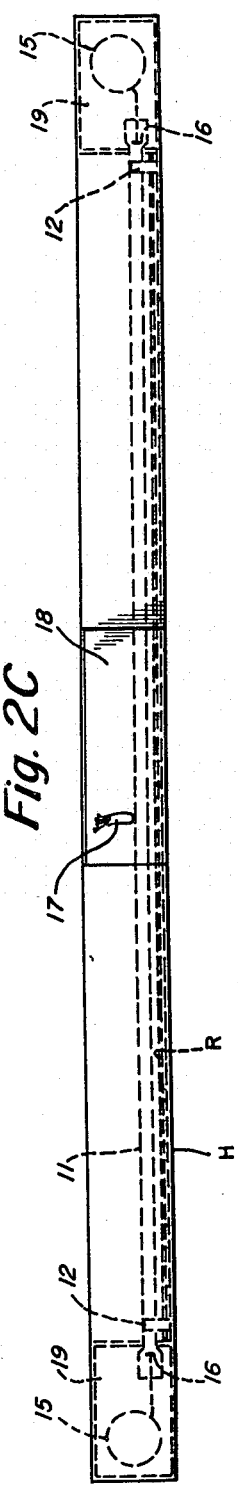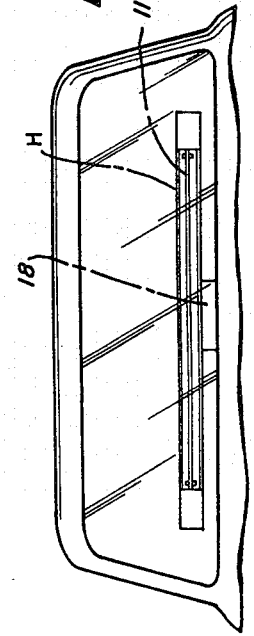

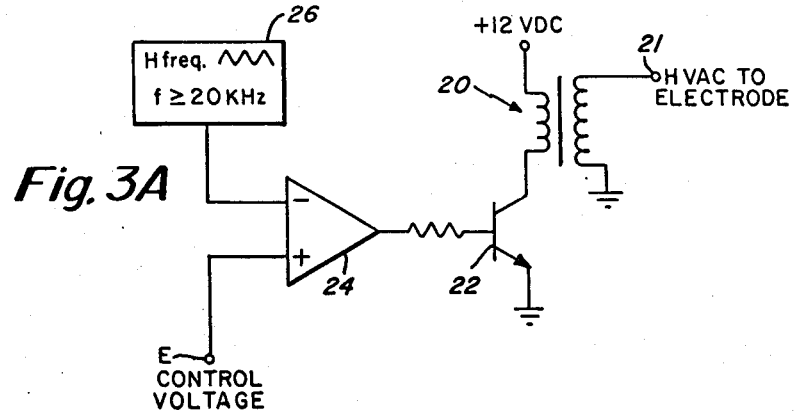
Fig. 3A
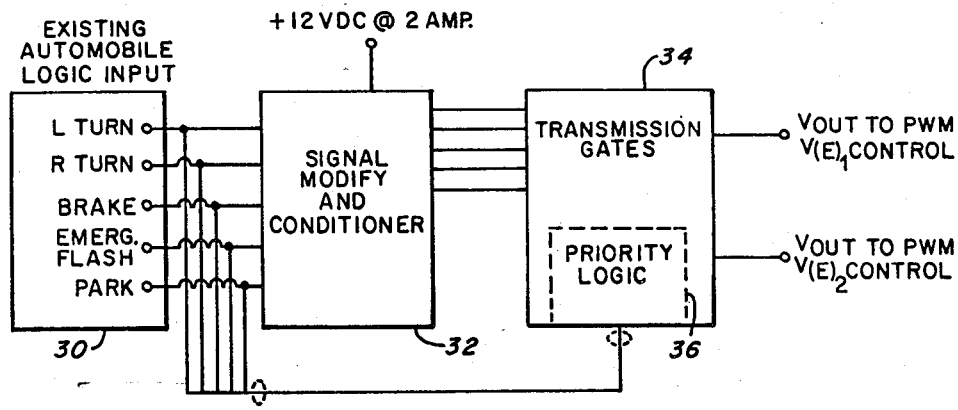
Fig. 3B
Fig. 3C
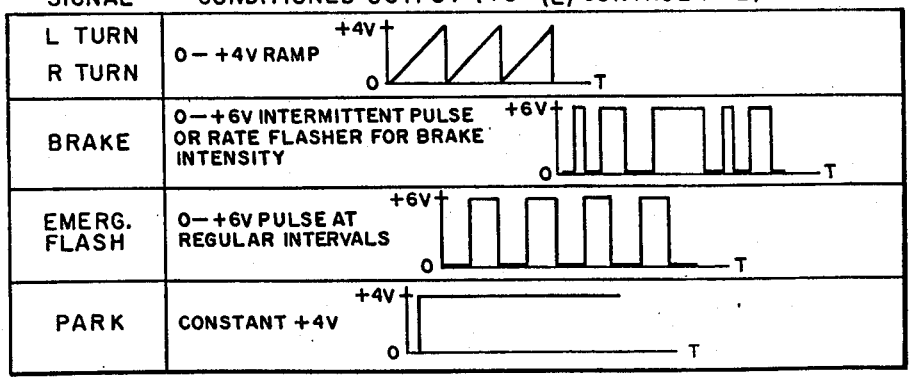

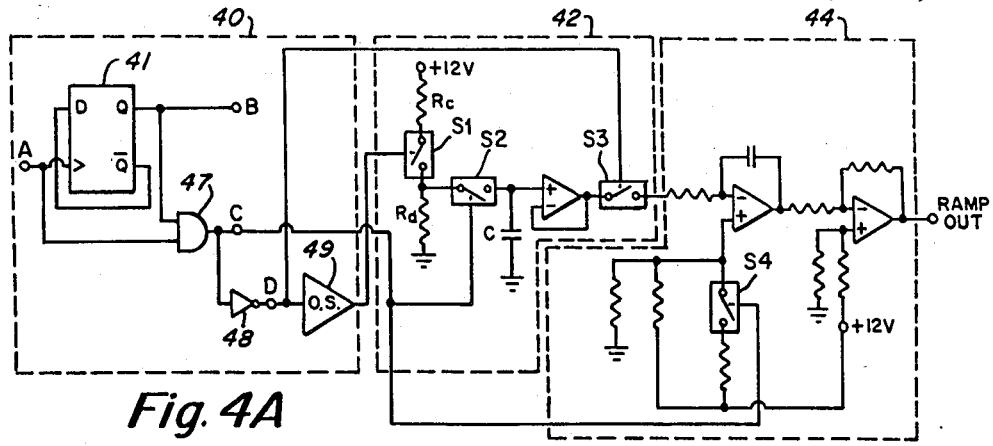
Fig. 4A
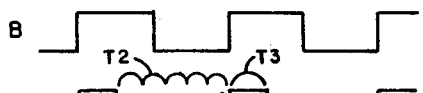
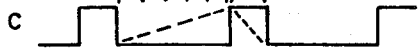
Fig. 4B
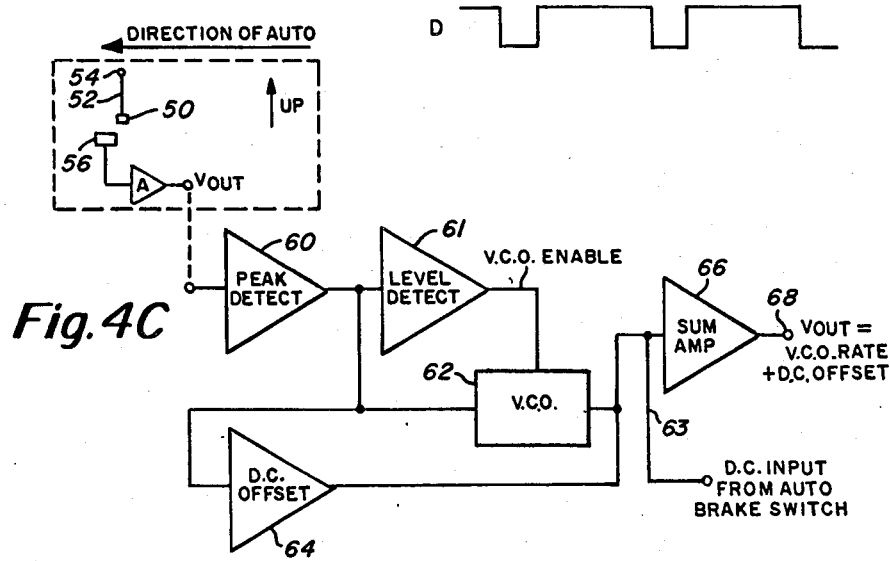
Fig. 4C
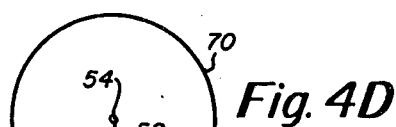
Fig. 4D
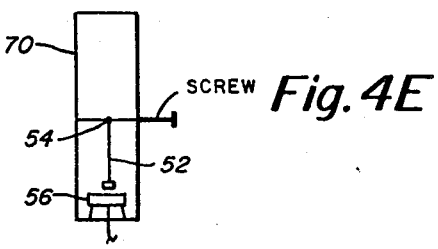
Fig. 4E

AUTOMOTIVE INDICATOR SYSTEM

BACKGROUND OF THE INVENTION

The present invention relates in general to an automotive indicator light system and pertains, more particularly, to a rare gas indicator system.

In present indicator light systems, indicator lights are typically mounted at the rear of an automobile and are intended to communicate the various operational states of the automobile to persons behind the automobile. The following list illustrates the pertinent rear indicator light functions:
- A. parking or marker lights
- B. brake lights
- C. left and right turn indicators
- D. emergency flasher lights These typical automotive functions are produced by light fixtures mounted at the far right rear and far left rear corners of the automobile. The average automotive system employs three separate light bulbs per side of the automobile. Parking lights utilize a single bulb per side and perform only the function of continuous light emission when activated by the driver. Brake lights utilize a separate single bulb per side and are actuated by the drivers depression of foot brake. When activated the brake light bulbs emit light at a higher intensity than that of the parking lights, then return to their natural off state when the foot brake is released. Turn indication and emergency flasher systems share the same bulb for their respective functions, one bulb at either side of the automobile. When a driver actuates a lever on the steering column of the automobile for a given turn indication, the appropriate bulb flashes on and off at a rate determined by an oscillator which allows current to flow through the bulb at regular intervals. The emergency flasher system is intended to indicate a warning condition and when actuated flashes both left and right turn indicator bulbs simultaneously, utilizing the same oscillator used for turning indication.

The physical composition of an indicator bulb is important to understand. They are without exclusion incandescent bulbs. An incandescent bulb is basically a filament of resistive material enclosed in a transparent evacuated envelope with either end of the filament brought through an airtight seal to separate contact points outside the envelope. When a voltage is applied to these terminals current flows through the filament and releases a quantity of light and heat. In typical automotive systems these bulbs are mounted in a protective housing recessed within the body, provided with a reflective surface and colored lens to enhance or optimize light transmission.

With the use of the conventional incandescent indicator arrangement it is noted that there is a need for multiple indicator bulbs, usually a total of six. These bulbs usually require relatively often and periodic replacement. The present indicators also, due to the nature of the incandescent bulb, do not provide rapid light response.

Accordingly, it is an object of the present invention to provide an improved automobile indicator light system and one which in particular employs a rare gas indicator tube.

Another object of the present invention is to provide an improved automobile indicator system in which all of the aforementioned indicator functions are provided preferably with a single indicator tube.

Another object of the present invention is to provide an improved automobile indicator light system that is characterized by rapid response time regarding light output.

A further object of the present invention is to provide an improved rare gas automobile indicator light system that provides clear indication of all automotive functions including a signaling of braking intensity.

SUMMARY OF THE INVENTION

To accomplish the foregoing and other objects, features and advantages of the invention there is provided a rare gas indicator light system that is capable, in a single rare gas tube, of providing all automotive signaling functions. In accordance with the present invention, the light output is produced not with a filament as with an incandescent source, but by the ionization of rare gases enclosed within an airtight transparent or phosphor-coated envelope. By impressing a voltage and current upon the rare gas mixture a light output is produced where the intensity of light is related to the amount of power delivered to the rare gas mixture and where the color of the light depends upon the mixture of rare gases and/or phosphors within the tube.

In accordance with the invention there is provided a hollow glass tube that is transparent and that is preferably of a length of approximately thirty inches with an outer diameter of three-eighths inch and internal diameter of, say, one-fourth inch. Electrodes are placed at either end of the tube so that a voltage and current may be easily impressed upon the rare gas mixture within. If a current and voltage are both impressed simultaneously at each electrode, the tube emits a quantity of light proportional to the amount of power applied to the electrodes. In the preferred embodiment of the invention the rare gases that are used are neon and argon, so that the color of light emission is red-orange. Suppose that the voltage and current impressed upon either end of the tube may also be at a partial percentage of the full power deliverable to the gas mixture. In this instance the tube produces a light output of lower intensity.

The tube, along with its associated power-generating components, is mounted at the rear of the automobile and is mounted in a horizontal position such as in a position intermediate to the position of presently existing incandescent fixtures. Alternatively, the tube may be mounted in the rear window deck area of the automobile so that an observer directly behind the automobile and facing the rear of the automobile sees a horizontal bar of red-orange light that terminates toward the left-most and right-most edges of the automobile.

The gas tube is operated from signals generated by the driver, many of these signals being generated in the same manner as presently occurs with the incandescent system. For example, when the driver actuates the existing parking light switch, this turns the tube on and the tube is controlled at, say, half intensity. This effect is essentially the parking light function of continuous medium intensity light emission. The power applied to each electrode of the tube is a function of a separate switch which is presently existent in an automobile. When the foot brake switch is operated it causes a doubling of power to the tube. As the driver depresses the foot brake the switch is activated and the bar of light doubles in intensity. The effect produces the basic braking function where light intensity is increased at the intervals when the driver depresses the foot brake.

The emergency flasher operation takes place from a control via the oscillator of the automobile for providing a flashing at some predetermined frequency. Finally, turn indications are created by selection of the electrode that is activated. For a right-turn signal, the left electrode only is activated by a ramp voltage that causes the bar of light to grow longer as it extends from the left-most electrode and proceeds toward the right-most electrode. The sweep effect of light propagation through the tube provides a clear and unique pointing effect in the chosen direction. A left-hand turn indication operates oppositely to the right-hand turn indication by virtue of excitation of the right-hand electrode that causes the bar of light to grow longer as it extends from the right-most electrode towards the left-most electrode.

BRIEF DESCRIPTION OF THE DRAWINGS

Numerous other objects, features and advantages of the invention should now become apparent upon a reading of the following detailed description taken in conjunction with the accompanying drawings, in which:

FIG. 2A is a front view of the indicator tube of the present invention;

FIG. 2B is a cross-sectional view of the tube of FIG. 1;

FIG. 2C is a bottom view of the indicator tube;

FIG. 2D illustrates the indicator tube mounted in the rear window of the vehicle;

FIG. 3A illustrates a circuit for powering each of the electrodes of the tube under voltage control;

FIG. 3B is a block diagram illustrating the general blocks that comprise the system of the present invention for providing inputs from existing automobile functions with outputs being provided to control the voltages at the electrodes;

FIG. 3C is a table illustrating waveforms associated with the different automobile functions;

FIG. 4A is a circuit for providing a synchronized ramp voltage output for left and right turn indication;

FIG. 4B illustrates waveforms associated with the circuit of FIG. 4A;

FIGS. 4C-4E show a brake intensity sensor circuit; and

DETAILED DESCRIPTION

Figure 1A:
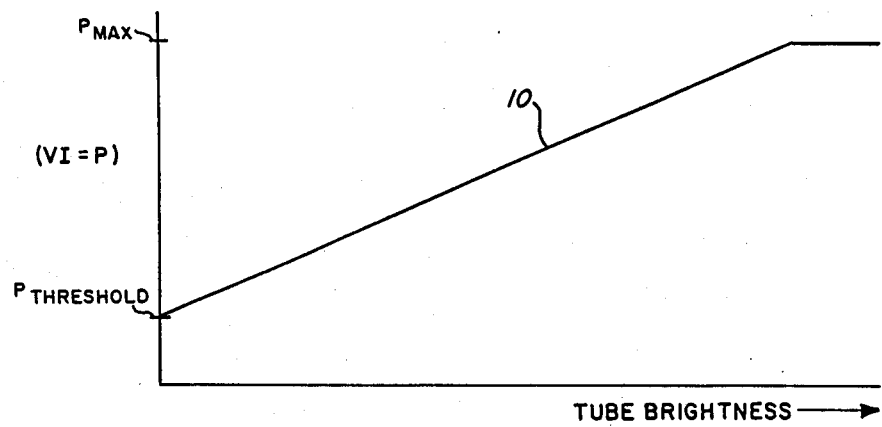
FIG. 1A is a graph illustrating the relationship between power delivered to the electrodes and the intensity or brightness of light emitted by the tube.

There is described herein in the drawings an improved automobile indicator lighting system employing a rare gas tube in place of the conventional incandescent lighting system. The rare gas tube is operated as described in further detail hereinafter so as to provide a parking or marker light indication. This is carried out by operating the tube at partial light intensity. The tube is also operated to indicate a braking function in which case the tube is illuminated at a full light output. Left and right-turn indications are indicated by providing a ramp input signal to the tube so that the light progresses either from left to right or from right to left depending on whether it is a left or right-turn indication. An emergency flasher signal is indicated by virtue of flashing the rare gas tube at some predetermined frequency of oscillation.

Reference is now made to FIG. 1A which is a graph showing the relationship between power delivered to the electrodes along the Y-axis and intensity of brightness of light emitted by the tube as represented along the X-axis. On the Y-axis there is shown a threshhold level and a maximum power level. Relative tube brightness is indicated by the X-axis where movement away from the origin indicates increasing brightness. Line 10 in FIG. 1A indicates a relationship between power delivered to the electrodes and relative tube brightness. It is noted that line 10 is essentially linear starting at the power level indicated as P-threshhold. This level indicates a minimum amount of power necessary to force the tube from a no-light emission condition to a minimum-light emission condition. The rare gas indicator light uses this linear region for execution of the parking and braking functions. For the parking function the tube is operated at a partial light output and for the braking function the tube may be operated at its maximum power output.

Reference is now made to the operation of the indicator tube for providing turn indications and also for an emergency flashing indication. For a right-hand turn indication power is applied to left-most electrode only. Power is slowly increased at that electrode. As power is increased to the threshhold level light emission occurs in close proximity to the left electrode. In this regard refer to FIGS. 2A-2C that illustrate the tube, the details of which are discussed hereinafter.

As power to the left electrode is increased the bar of light grows longer as it extends from the left-most electrode and proceeds toward the right-most electrode. At the maximum power level indicated in FIG. 1A the entire bar is lit. At that point the power source is then turned off so that the power is equal to zero and the process repeats itself. As with the previous switching arrangements that are necessary for the parking and braking functions, circuitry is provided as described in further detail hereinafter, so that a driver actuating the automobile right-turn indicator switch causes the left-most electrode power to behave as described, and to continue its cycle until the right-turn indicator switch is deactivated. This sweep effect of light propagation through the tube provides a clear and unique pointing effect in the chosen direction.

A left-hand turn indication is provided in substantially the same way as a right-hand turn indication except that the power is applied to the right-most electrode and is actuated by the left-turn indicator switch. For a left-hand turn indication the light sweeps through the tube to also provide a pointing effect in the left direction.

The emergency flasher indication is provided by a simple on/off pulsing light emission with power applied simultaneously at both electrodes to produce both P-maximum and P-minimum signals at regular intervals dictated by the automobile oscillator and the driver's actuation of the emergency flasher switch.

The rare gas tube that is provided in accordance with the present invention is constructed to provide a unique sweeping motion that is not segmented but rather is in a continuous bar of light that grows in length and offers a definite pointing effect in a chosen direction. This concept is not at all realized from the ordinary incandescent bulb. Another advantage of the rare gas tube is that the light output may be switched virtually instantaneously. This means that if power at the electrode is varied from zero to P-maximum the light emission responds as quickly. Likewise, if power at the electrodes goes from a maximum to zero the light emission will also cease virtually instantaneously. The same type of operation is not possible with incandescent bulbs as the light-producing filament remembers its previous state and only gradually assumes a new state.

Figure 1B:
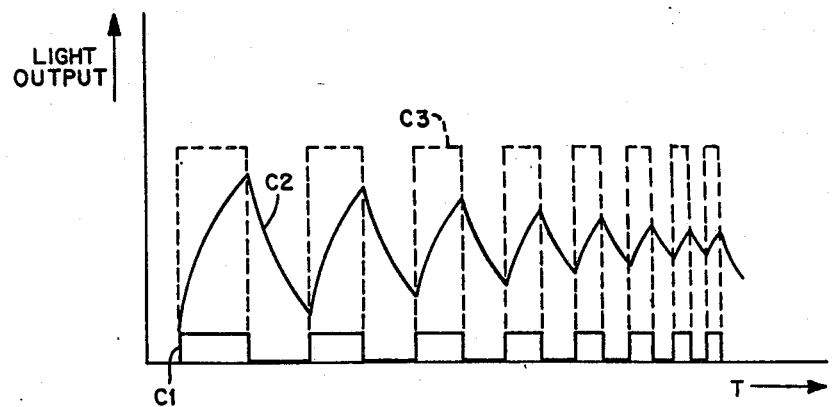
FIG. 1B illustrates light response for both an incandescent and a rare gas indicator from an oscillating control signal.

The graph of FIG. 1B presents the rare gas "memory" versus the incandescent "memory" for various time periods. The square wave of signal C1 is the control signal. The solid signal C2 shows the incandescent response while the signal C3 shows the rare gas response. The rare gas graph indicates a faithful replica of the control wave form whereas the incandescent has gradual slopes indicating its reluctance to reach a new state. As the period of the command signal shortens, the incandescent tends to average the command signal and appear to remain "on" in a half-lit state. This difference is important in several respects. The rare gas media produces a more eye-catching display because of its on/off characteristic. The snappy response of the rare gas light emission suggests a higher degree of urgency than the lazy flash of the incandescent, much as a strobe light would suggest urgency. The rare gas light emission can easily maintain this fast response over the entire range of the human eyes ability to perceive separate on/off periods, or about thirty cycles per second. At rates faster than this the eye integrates the information and the light appears to be continuous even though it is still switching. However, the rare gas tube performs this given perceptual range of flashing most accurately.

Reference is now made to FIGS. 2A–2D which illustrate the rare gas tube 11. This rare gas tube may be disposed in the position 2D in the rear window of the vehicle so as to provide a clear indication to people behind the vehicle. The rare gas tube 11 is supported by mounting tabs 12 at either end thereof which are in turn supported by the housing H. The housing H is a U-channel with one long open face which exposes the rare gas tube toward the rear of the vehicle. The U-channel may be 36 inches long, 2 inches deep and 2 inches high. The rare gas tube 11 is preferably about 33 inches long and is recessed within the U-channel and placed at the focal point of a parabolic reflector R. In this regard note FIG. 2B and the relationship between the rare gas tube 11 and the reflector R. The parabolic reflector is to be electrically conductive and serves as a brightness enhancer by reflection and by remaining at ground potential to further excite and enhance the ionization process within.

At the base of the U-channel housing and in the center of the U-channel housing is a circuitry housing 18 which is about 6 inches long, 2 inches deep and 4 inches high. This serves also as a mounting block for the attachment of the entire unit to the automobile.

At each end of the housing H are closed sections 19 which are about 3 and one-half inches long, 2 inches deep and 2 inches wide. These end sections each contain a rare gas tube electrode 16 and provision for the mounting of a step-up transformer as indicated at 15. The secondary of the transformer is connected to the tube electrode 16. A wiring channel is provided at the rear of the parabolic reflector and runs the entire length of the housing H. The primary winding of each transformer utilizes two wires which return through this space to the control housing 18 at the center of the housing H. Several wires are brought out as indicated at 17 and run through the car to provide power from the twelve volt automobile electrical system and to sense the various indicator functions. Circuitry inside the housing 18 performs the task of interpreting the various indicator functions and forcing the rare gas tube to emit light in a fashion appropriate to a given function. In this regard reference will be made hereinafter to circuitry that is described in association with the control of the present invention.

As indicated previously in the standard incandescent bulb arrangement the automotive functions previously referred to are carried out with the use of six separate bulbs. On the other hand, the rare gas indicator of the present invention performs the aforementioned functions with essentially a single source. Now, in association with these different functions, it is noted that the emergency flasher lights are used only when a car is disabled. It is unlikely that an emergency flasher becomes actuated at the same time that any of the other functions are actuated. Therefore, it is assumed that if the emergency flasher is actuated, the rare gas tube simply pulses on and off at a rate identical to the automobile flasher rate. This function taken alone seems to present itself simply and would not appear to conflict with other functions.

A further consideration with regard to the automobile functions may be considered as a worst-case example. Assuming that a vehicle is driving at night with lights on, during this period the parking lights are actuated so that the rare gas tube is lit at a medium intensity. If the driver desires to make a right-hand turn, for example, and at the same time brakes the car intermittently to slow down for the turn, in this situation three functions are demanded simultaneously, namely, parking lights, brake lights and right-turn indicator lights. Combining these three functions and displaying them with the single tube could provide a confusing display. However, in this case the circuitry of the present invention is adapted to decide which of the three functions is of priority. When the turn signal is but one of the signals simultaneously actuated it is chosen to let the turn signal be of top priority. Therefore, the circuit selects the right turn indication and displays that information only until the turn is completed and the switch is deactivated. At that point the tube returns to medium intensity indicated by the parking light switch. Therefore, the following priority list is adopted for the single tube rare gas indicator:

A. turn indication
B. brake indication
C. emergency flasher indication
D. parking light indication

Having now described the rare gas tube with its electrode arrangement along with a listing of priority of actuation, attention is now directed to the control means for powering the electrodes. In this regard reference is made to FIG. 3A which shows the power supply. Since the vast majority of automotive electrical systems operate with a twelve volt DC electrical supply, the indicator system is designed to operate directly from that supply. In this regard note the twelve volt DC reference in FIG. 3A.

One way to provide voltage for the rare gas tube from a twelve volt DC system is with a step-up transformer 20 and some means of switching an AC voltage at the primary thereof to produce the secondary voltage range of approximately 80-1000 volts AC. In FIG. 3A the step-up transformer 20 has its primary winding attached to +12 Vdc and the other end connected to ground through the transistor 22. The base of transistor 22 is tied to the output of the operational amplifier 24 where the operational amplifier is configured as a pulse width modulator controlled by constant high frequency triangular wave source 26 and also controlled by the control voltage at terminal E. If the control voltage is zero volts, the output of the operational amplifier 24 is also zero volts and the transistor 22 is off or non-conducting. Therefore, the voltage to the electrodes is also zero and the rare gas lamp is off. If the voltage at terminal E is slowly increased, a square wave pulse train output appears at the output of the operational amplifier 24. The frequency of this pulse train remains constant for any input control voltage as long as the frequency of the source 26 remains constant. The frequency of the source 26 is triangular in shape and may be at a frequency of 20 KHz or greater. The operational amplifier output pulse train has a duty cycle that is linearly proportional to the control voltage so that as the control voltage increases, the duty cycle of the operational amplifier output increases to some optimum value. The switching transistor 22 responds to this pulse train by turning on for the period that the operational amplifier output is high and then off as the operational amplifier output returns to zero volts. This induces current flow in the transformer primary winding which induces a voltage in the secondary winding. The secondary voltage is proportional to the time the primary is switched on and off and to the secondary/primary turns ratio of the transformer. Thus, by varying the pulse width of the operational amplifier output with the control voltage E, the circuit in FIG. 3A induces a variable voltage at its output terminal 21. This voltage when applied to the electrode produces the various intensities and length of light propagation through the rare gas tube. The control of the electrode is based solely upon the voltage applied to the control terminal E.

It is furthermore noted that in connection with the circuit of FIG. 3A this driver is provided, one for each electrode.

Now, one determines and forms the appropriate waveforms at the control voltage terminal E for each respective function. The circuitry described hereinafter provides logic for the priority list decisions. In this regard refer to FIG. 3B which is a simplified block diagram including an input block 30, a signal modifier and conditioner block 32 and an output block 34 including priority logic 36. With regard to FIG. 3B reference will also be made hereinafter to the logic diagram of FIG. 5.

The input block 30 gathers the automobile functions into one area. In this regard note that there is indicated therein the turn indications, brake, emergency flasher and park indications. These different functions may be sensed from the existing taillight wiring, or at a fuse box, wherever they are conveniently centralized. The voltage levels produced by the automobile, namely 0-12 Vdc along with the signals from block 30 are coupled to the signal modifying and conditioning block 32 where the signals are conditioned and modified into signal levels to provide voltage control to produce the desired light emission characteristics in the rare gas tube. These condition signals are fed to the output block 34. Block 34 contains an array of analog signal transmission gates (see FIG. 5). These gates have an input, an output and a control voltage terminal. The control voltage signal is a simple on/off function and determines which of the conditioned waveforms from the block 32 pass through to the voltage control of the pulse width modulator of FIG. 3A. The priority logic block 36 contains the logic necessary to realize the function priority list and senses that list from the appropriate functions delivered from block 30. When the logic determines the appropriate function to be displayed, it turns on the appropriate transmission gate and that waveform is fed to the pulse width modulator to produce the desired effect in the rare gas tube.

With regard to existing automobile flashing systems, it is noted that the flash rate varies from automobile to automobile and will even vary with a single automobile. This fact is due to the construction of the automobile flasher unit which uses current flow and the heating of a coil to open and close its mechanical contacts. Heat, cold and the type of incandescent bulb and actual switching coil characteristics all tend to vary the average pulse duration over a given range. Also, the average on/off period of the oscillator is about 0.5 seconds. This is too short a period for a clear and definite sweep motion in the rare gas tube. A slower rate of sweep is desired so as to give a clear turn indication. Also, synchronization of the sweep motion with the automobile's flasher unit contributes to clear and coherent display. Finally, the sweep motion should have the same start and finish point for any period T of the automobile's oscillator.

Reference is now made to FIG. 4A which illustrates a circuit for providing a ramp output signal for particularly controlling the turn indication functions associated with the tube. In this regard refer in FIG. 4B to the waveforms A, B, C and D. Waveform A is the oscillator flash rate of the automobile. This is taken from the standard oscillator that is contained in the automobile. Waveform B is the waveform A divided by two, thus having one-half the frequency. Waveform C is a gated pulse train derived from waveforms A and B and waveform D is an inverted waveform C. All waveforms are synchronous with waveform A. It is noted in connection with waveform C that the dotted line during period T-2 represents the sweep period of the rare gas tube for the turn indication. The period T-3 of waveform C represents the gas tube's "off" period. Thus, it can be seen that the sweep time is 1.5 times T-1 and the "off" or rest period is 0.5 times T-1. This arrangement lengthens the sweep time and maintains synchronism of sweep with the oscillator of the automobile.

Now, considering the indefiniteness of period T-1, it is desired that for any period T-2, the sweep should start exactly at the falling edge of period T-2 and finish at the rising edge of T-2. In this regard refer to FIG. 3C TABLE I which shows the waveform for turn indication along with other waveforms associated with the other functions. It is noted that for left and right-hand turn indications this waveform is a ramp waveform that represents the sweep rate. For any value of period T-2 the minimum voltage is zero and the maximum voltage is preferably about +4 V. The only parameter that changes is the slope of the ramp. In this connection, FIG. 4A illustrates a circuit that accomplishes this automatically and updates the new slope value every auto-flash period T-3.

In FIG. 4A there are shown three basic blocks. Block 40 produces the waveforms A-D from the automobile oscillator. In this connection, there is included in block 40 a flip-flop 41, gates 47 and 48 along with a one-shot multivibrator 49. Also note in block 40 that the individual waveforms are shown on the circuit directly as at the corresponding points A-D.

In FIG. 4A the block 42 is a sample and hold circuit that produces a voltage at the output S3 that is proportional to the duration of the period T-3. By charging the capacitor C with a short pulse from the one-shot 49, and allowing a decay period, a specific voltage level is produced and latched by the switch S2 at the falling edge of the period T-3. The output of block 42 becomes the input for the integration network which is block 44. Because the slope of the integrator is related to the value of the input to the circuit, the circuit is able to produce the necessary slope for nearly a decade range of period T-1 by the proper selection of RC values for the integrator and RC values for the decay network of block 42. Note that in application the circuit will reset itself at the end of a turn event by pulsing input A until waveforms A-D are as shown prior to the rising edge of T-1. This readies the circuit to accept a new waveform A at the next turning event. Thus, FIG. 4A is one example of a network that solves the synchronization problem and the automatic selection of proper sweep speed for a range of periods T-1. Again, the output of FIG. 4A is a ramp signal as illustrated in FIG. 3C for controlling right and left-turn indications.

With regard to the emergency flasher operation, this may be controlled from waveform A directly from the automobile's oscillator to produce a simple on/off flashing of the tube synchronized with the normal taillight flash rate. In this regard note FIG. 3C and the pulse output for controlling emergency flashing.

The parking function is a continuous light emission as indicated in FIG. 3C also. To provide this all that is required is a simple voltage divider to produce an input control voltage for the pulse with modulator of FIG. 3A. Reference will be made to this hereafter in connection with FIG. 5.

The last function that is to be addressed is the braking function. Existing automobile brake systems utilize a simple single state of brightness to indicate braking of the automobile. They do not indicate the intensity of the braking action. Because the rare gas indicator tube can markedly vary its brightness and its on/off rate, it is the intention of the present invention to produce a brake intensity indicator utilizing both brightness and flashing rate. For example, the panic stop is indicated by flashing the rare gas tube at a rapid rate and at its most intense light output. A medium braking action is indicated by high light output level but at a slower flash rate than in the panic stop condition. Lastly, a more gentle braking action is indicated by increasing the light output without any flashing action.

With regard to sensing of braking intensity, reference is now made to FIGS. 4C-4E. In FIG. 4C there is shown a sensor including a magnet 50 placed at the end of the swing arm 52, which arm is supported from a pivot at 54. The magnet is close to a hall effect sensor 56 when external force causes the arm to swing closer to the hall effect device producing a voltage at the output terminals of the sensor. Suitable placement of the magnet and sensor is provided so that a linear range of output voltage is produced proportional to the distance of the magnet from the sensor. The swing arm 52 is adapted to move only in the direction of the automobile's forward travel, and the sensor is placed somewhat forward of the magnet's rest position. As the automobile brakes, the magnet swings toward the sensor and produces a specific output voltage which is sampled by a peak detector 60. The peak voltage is coupled to a voltage controlled oscillator 62, to a DC offset circuit 64 and level detector 61. Level detector 61 enables the VCO, turning it on at some predetermined peak detector voltage value. The output of VCO 62 and DC offset 64 combine with a steady state DC voltage level 63 in summing amplifier 66. Thus, the output of the summing amplifier 66 is a steady DC signal actuated by the automobile foot brake switch, plus the braking intensity sensor's contribution of a variable frequency AC voltage and a variable DC offset. Note that the intensity sensor is used to produce a control voltage series for the enhancement of an existent DC level brake signal at the pulse width modulator input. The output at terminal 68 is a control signal that provides a flashing rate that is a function of peak voltage and in which there is a DC offset to provide varied illumination as a function of peak voltage detected.

Thus, it can be seen that the circuit of FIG. 4C provides multiple brake indications at its output. In a first condition, when the vehicle is not operative, if the brake pedal is depressed, then there is a signal on line 63 to provide a minimum light output level via control through the summing amplifier 66. When a minimum amount of braking occurs, the VCO 62 is not enabled because the output of the level detector 61 has not reached its threshhold. Thus, there is no pulsating operation or flashing operation, but there is an increase in intensity by virtue of the output of the peak detector coupling by way of the DC offset 64 to the summing amplifier 66. For medium intensity braking, the level detector threshold is exceeded and there is an enable signal to the VCO 62. This provides a combination of signals to the summing amplifier including an oscillating signal for providing flashing and also increased intensity by virtue of the DC offset. Finally, at maximum braking intensity, the DC offset is at a maximum and the output of the VCO is also at a maximum flashing rate.

A sensor in FIGS. 4D and 4E is mounted in a rotating cavity 70 so that the output voltage may be calibrated to produce a minimum voltage while the automobile is at rest. This is necessary because the entire housing may not be perfectly level. Some mechanical damping of the swing arm may be necessary, but the peak detector provides electrical damping with its fast attack and slow decay period.

Figure 5:
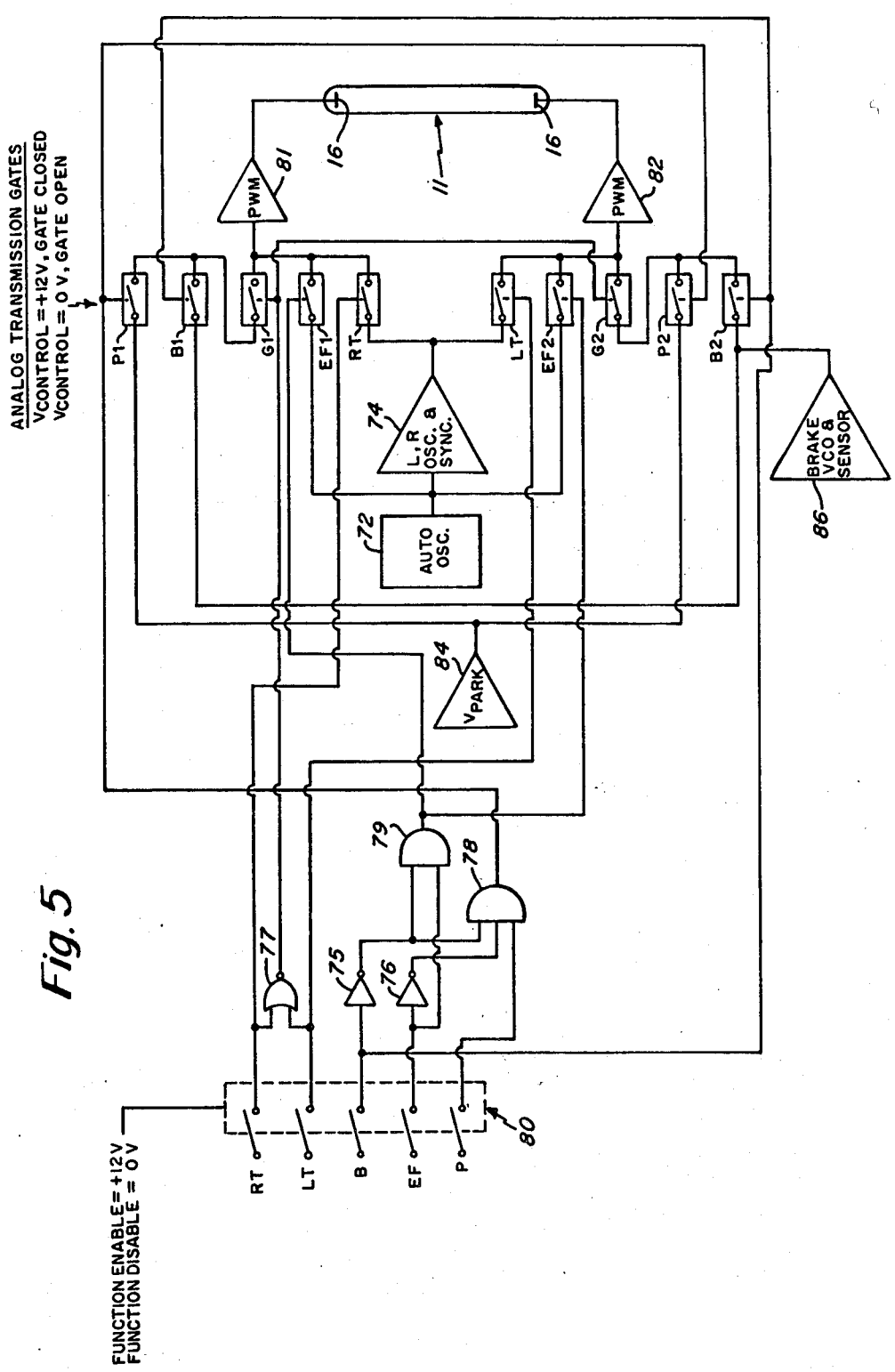
FIG. 5 is a larger diagram showing the system of the invention including the input control switches for controlling the various automotive functions along with the electrode excitation at the tube.

Reference is now made to FIG. 5 which shows circuitry and further detail as previously referenced in FIG. 3B. For example, in FIG. 5 there is shown the priority logic that controls the sequence of operation regarding the different functions that may be inputted to the circuit. The transmission gates are illustrated in FIG. 5 by the series of analog switches identified as switches P-1, P-2, B-1, B-2, EF-1, EF-2, LT and RT. The signal conditioning is carried out by various means previously described such as the circuits of FIGS. 4A and 4B. For example, in FIG. 5 there is shown the left and right oscillator and synchronizer 74 which couples from the automobile oscillator 72. With regard to these circuits refer to FIG. 4A. At the output of circuit 74 is the ramp signal generated from the circuit of FIG. 4A. It is noted that this output couples to both right and left control gates RT and LT respectively. It is furthermore noted that the output of the oscillator 72 couples to the control gate EF-1 and EF-2. The control signals for these various gates couple from the logic that is described. These control priority gates include inverters 75 and 76, NOR gate 77 and AND gates 78 and 79.

FIG. 5 also shows the input control switches in box 80 for controlling right and left turn signals, braking function, the emergency flashing function and the parking function.

FIG. 5 also shows the rare gas tube 11 with its associated electrode 16 being controlled from the pulse with modulators 81 and 82. The circuits 81 and 82 may be of a type described in FIG. 3A controlled from gate switches G-1 and G-2. The pulse with modulator circuits also receives signals relating to turn indications and emergency flashing. Finally, in FIG. 5 there is shown the parking control circuit 84 and also the brake VCO and sensor circuit 86. The circuit 84 may be a simple voltage divider. The circuit 86 may be the type described in FIG. 4C. It is noted that the circuit 84 couples to both of the gates P-1 and P-2 for controlling of parking function to the tube. The circuit 86 couples to the input of both gates B-1 and B-2 for controlling braking indications at the rare gas tube.

Now, with regard to the operation of FIG. 5, reference has been made herein before to the priority list in which turn indications have top priority. Thus, if either a right turn or a left turn indication is indicated, either one of the gates LT or RT is enabled and the output of the circuit 74 thus couples to the pulse with modulator circuits 81 or 82 depending on whether it is a left turn or a right turn. The gate 77, as long as either of the turn indicators are activated, has a low output which disables gates G-1 and G-2 and thus the only control to the pulse with modulators 81 and 82 is directly from the ramp signal as coupled with the circuit 74. This logic control provided by gate 77 thus assures that the turn indications have top priority. This means that even if a parking light indication is forthcoming and even though gates P-1 and P-2 are enabled, this disabling of gates G-1 and G-2 prevents any control from that part. This means that only left or right turn indications are signaled. Now, if there is no turn indication being signaled but instead a braking indication is being signaled, then gate 78 is disabled as well as gate 79 meaning that the braking function takes priority over emergency flashing or parking functions. The braking function provides for enabling of gates B-1 and B-2 and thus braking control is provided by way of gates G-1 and G-2 to the pulse with modulator circuits 81 and 82. Assuming that the turn indication signals are not being generated, then the output of gate 77 is high enabling gates G-1 and G-2 so that the braking control functions may be carried out and so that the circuits 81 and 82 may be operated from the circuit 86 for controlling the rare gas tube 11.

Now, during a braking function, if the emergency flasher or the parking switch is activated, the gates 78 and 79 prevent any operation from occurring via those two functions.

The next function is the emergency flashing function and when this occurs the gates 76 and 78 prevent any parking function from being registered. However, emergency flashing function is controlled at the output from gate 79 to the gates EF-1 and EF-2 for enabling thereof. It is noted that both of these gates receive signals directly from the automobile oscillator 72 for providing a pulsing signal at the output of the gates EF-1 and EF-2 directly to the circuits 81 and 82 for causing pulsing of the rare gas tube.

Lastly, when only the parking function is operated, then the gate 78 is enabled because both of the other inputs thereto are also high, assuming the brake and emergency flashing functions are not being operated. The output of gate 78 is thus high providing an enabling signal to the parking gates P-1 and P-2. The voltage divider output from the circuit 84 provides a voltage signal that is coupled by way of gates G-1 and G-2 to the circuits 81 and 82. This causes operation of the rare gas tube 11 at a partial intensity as controlled by the voltage divider in the circuit 84.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A rare gas automobile indicator light system comprising;
   an elongated rare gas tube having a pair of electrodes, one disposed at each end of the tube,
   means for mounting said rare gas tube at the rear of the automobile in a position viewable behind the automobile,
   means for controlling power applied to both electrodes on a selective basis to provide illumination of the rare gas tube,
   said means for controlling including first control means operative from first switch means for exciting only one electrode at a variable increasing power level to cause light intensity to progress from the end of the tube at which is disposed the excited electrode to the other end of the tube to thereby provide a light sweeping effect to indicate one of right and left turn indication,
   and second control means operative from second switch means for simultaneously exciting both electrodes at a substantially constant power level to provide a substantially constant light output to indicate one of park and brake indication.

2. A rare gas automobile indicator light system as set forth in claim 1 including a housing for said elongated rare gas tube.

3. A rare gas automobile indicator light system as set forth in claim 2 including a reflector in said housing, said housing being a U-shaped cross-section and said elongated rare gas tube being disposed at the focal point of the reflector.

4. A rare gas automobile indicator light system as set forth in claim 3 wherein said elongated rare gas tube is mounted in a rear window of the vehicle.

5. A rare gas automobile indicator light system as set forth in claim 4 wherein rare gas tube is mounted between the existing incandescent lights on the automobile.

6. A rare gas automobile indicator light system as set forth in claim 5 wherein the rare gas tube is mounted in a substantially horizontally position.

7. A rare gas automobile indicator light system as set forth in claim 6 wherein said first switch means includes right and left switches, one for controlling one electrode and the other for controlling the other electrode.

8. A rare gas automobile indicator light system as set forth in claim 7 wherein the right switch controls the left electrode for providing a right pointing light indication.

9. A rare gas automobile indicator light system as set forth in claim 8 wherein the left switch controls the right electrode for providing a left pointing light indication.

10. A rare gas automobile indicator light system as set forth in claim 9 wherein first control means includes means for providing a ramp voltage for control of said electrodes.

11. A rare gas automobile indicator light system as set forth in claim 10 wherein further including a priority logic means associated with said control means for establishing a priority of operation of elongated rare gas tube.

12. A rare gas automobile indicator light system as set forth in claim 11 wherein said priority logic provides for priority of said first control means over said second control means whereby turn indications take priority over park and brake indications.

13. A rare gas automobile indicator light system as set forth in claim 12 wherein said second control means include brake circuit control means adapted to operate the rare gas tube at maximum intensity.

14. A rare gas automobile indicator light system as set forth in claim 13 wherein second control means also includes separate park control means for operating said rare gas tube at partial intensity.

15. A rare gas automobile indicator light system as set forth in claim 14 wherein said second control means includes a brake sensor including means for providing an alternating control signal to provide pulsing operation of the rare gas tube in combination with a power offset circuit for providing a variable intensity of light output as a function of braking intensity.

16. A rare gas automobile indicator light system as set forth in claim 15 wherein the frequency of oscillation of the rare gas tube is at a frequency that is a direct function of braking intensity whereby the frequency of operation is greater for greater braking intensity and lesser for lesser braking intensity.

17. A rare gas automobile indicator light system as set forth in claim 16 including third control means operative from a third switch means for pulsing both electrodes at a predetermined frequency to provide a pulsing light output to indicate an emergency flashing indication.

18. A rare gas automobile indicator light system as set forth in claim 17 including means for driving said electrodes including pulse modulation means.

19. A rare gas automobile indicator light system as set forth in claim 18 wherein said first and second control means provide control voltages for controlling said modulation means.

20. A rare gas automobile indicator light system as set forth in claim 19 wherein said control voltages include a ramp voltage for turn indication, a steady-state voltage for at least a park indication, and a pulsating voltage for indicating at least emergency flashing operation.

21. A rare gas automobile indicator light system as set forth in claim 1 wherein the rate of turn sweep is synchronized with the automobile turn indication rate and automatically adjusts its sweep rate to maintain synchronism over a range of automobile oscillator periods.

* * * * *